United States Patent [19]
Shapiro

[11] Patent Number: 5,993,161
[45] Date of Patent: Nov. 30, 1999

[54] ROTORS WITH MISTUNED BLADES

[75] Inventor: Benjamin Shapiro, Pasadena, Calif.

[73] Assignee: California Institute of Technology, Pasadena, Calif.

[21] Appl. No.: 09/027,352

[22] Filed: Feb. 20, 1998

Related U.S. Application Data

[60] Provisional application No. 60/038,647, Feb. 21, 1997, and provisional application No. 60/041,017, Mar. 19, 1997.

[51] Int. Cl.[6] .............................. B64C 27/46; F01D 5/14; F03B 3/12
[52] U.S. Cl. ...................... 416/203; 416/203; 416/175; 416/241 R; 416/500; 416/223; 415/119; 29/889.1; 29/889.21; 29/404; 29/407.01; 364/578; 364/468.03; 364/468.04
[58] Field of Search ........................... 415/119; 416/203, 416/175, 241 R, 500, 223; 29/889.1, 889.21, 404, 407.01; 364/578, 468.03, 468.04

[56] References Cited

U.S. PATENT DOCUMENTS

| | | |
|---|---|---|
| 4,097,192 | 6/1978 | Kulina ...................................... 416/175 |
| 5,388,956 | 2/1995 | Pla et al. . |
| 5,391,053 | 2/1995 | Pla et al. . |
| 5,566,907 | 10/1996 | Marze et al. . |
| 5,620,300 | 4/1997 | Knuijt .................................... 415/19.6 |
| 5,620,303 | 4/1997 | Moffitt et al. ............................ 416/87 |

OTHER PUBLICATIONS

Chi et al., Some Recent Advances in the Understanding and Prediction of Turbomachine Subsonic Stall Flutter, Transactions of the ASME, vol. 107 pp. 408–417 (Apr. 1985).

Srinivasan et al., Effects of Mistuning on Resonant Stresses of Turbine Blades, The Winter Annual Meeting of The American Society of Mechanical Engineers, pp. 57–71 (Dec. 5–10, 1976).

Whitehead, D.S., Effect of Mistuning on the Vibration of Turbomachine Blades induced by Wakes, Journal Mechanical Engineering Science, vol. 8 No. 1 1966, pp. 15–21 (1966).

*Primary Examiner*—F. Daniel Lopez
*Assistant Examiner*—Rhonda Barton
*Attorney, Agent, or Firm*—Fish & Richardson P.C.

[57] ABSTRACT

A method for designing a mistuned rotor with improved stability and forced response.

9 Claims, 7 Drawing Sheets

FIG. 9

ROTORS WITH MISTUNED BLADES

This application claims the benefits of U.S. Provisional Application Nos. 60/038,647 filed on Feb. 21, 1997 and 60/041,017 filed on Mar. 19, 1997, which are incorporated herein by reference.

FIELD OF THE INVENTION

The present invention relates to rotors, and more specifically, to configurations of rotors in turbomachines and the like.

BACKGROUND OF THE INVENTION

A rotor in its simplest form includes two primary parts, a rotatable disk and multiple blades mounted on the disk in a certain pattern with respect to the disk center. Rotors are used in two configurations in many machines: using the rotation of blades of a powered rotor to propel a gas or liquid and using a moving gas or liquid to rotate the rotor which in turn generates driving power. For example, a fan uses the rotation of blades of an electrically driven rotor to cause air circulation; a motor boat uses the rotation of blades of a fuel-powered rotor to propel water, thus causing the boat to move; a turbine engine implements complex rotors to compress inlet air to generate a high-pressure air flow to a combustion chamber and to use a portion of the static and kinetic energy of the air flow from the combustion chamber for driving an air compressor.

However implemented, blades of a rotor interact with a fluid in gaseous or aqueous form and exhibit complex dynamic behaviors. There have been tremendous efforts in researching the aerodynamic and mechanical properties of blades and the blade spatial distribution around the center disk. The blade design and blade spatial distribution for rotors used in air compressors and turbines for aircraft engines are particularly critical because these rotors operate at high rotational speeds (e.g., up to 8000 rpm or higher) in gas flows of high pressure variations, high-temperature (e.g., up to 2000° F. or higher), and high fluid speeds (e.g., up to 2000 ft/sec or higher).

One technical issue in designing a rotor is the blade spatial distribution. Blades of a rotor not only interact with the surrounding fluid but also are dynamically coupled to one another through their interaction with the fluid. This dynamic interaction results in complex dynamic behaviors of the blades. A properly designed blade spatial distribution can prolong the lifetime of blades and reduce failure of blades.

Ideal blades in a rotor are identical to one another in all respects of a blade, such as shape, dimension, material composition, and material uniformity, etc. In this ideal case, any blade behaves exactly like any other blade. Such an ideal rotor is said to be "tuned".

However, manufacturing processes inherently produce small variations in blades. This causes mistuning of the blades. Variations from one blade to another in a rotor may also be caused by wear through a period of operation. It has been recognized that such mistuned blades, even if within the manufacturing tolerances, can cause instabilities in the rotor operation and introduce adverse forced responses of the blades with associated high cycle fatigue. Both instabilities and high cycle fatigue can ultimately lead to failure of a turbine engine.

Many techniques have been used to analyze the effects of mistuned turbomachines. See, for example, Bendiksen, "Flutter of mistuned turbomachinery rotors," ASME Journal of Engineering for Gas Turbines & Power, vol. 106, pp. 25–33 (1984); Dye and Henry, "Vibration amplitudes of compressor blades resulting from scatter in blade natural frequencies," ASME Journal Engineering for Power, Vol. 91, pp. 182–188 (1969); Srinivasan and Frye, "Effects of mistuning on resonant stresses of turbine blades," in Structural Dynamic Aspects of Bladed Disk Assemblies, 1976; and Whitehead, "Effect of mistuning on the vibration of turbomachine blades induced by wakes," Journal Mechanical Engineering Science, Vol. 8, pp. 15–21 (1966).

SUMMARY OF THE INVENTION

The present disclosure describes design methods and blade configurations to improve the stability and/or forced response of a bladed rotor with mistuned blades.

One aspect of the invention determines a blade arrangement in a rotor to achieve maximized stability boundaries or optimized forced response for a given set of mistuned blades.

A method of designing and constructing a rotor having mistuned blades includes the following steps:

selecting a system model that simulates aerodynamics of said rotor, said system model including a specified aerodynamic parameter indicative of an aerodynamic property of said rotor;

applying a selected symmetry to said system model to simplify computation complexity of said system model;

determining a correlation between said specified aerodynamic parameter and a mistuning parameter of said blades; and arranging said blades with respect to one another in a sequence based on said correlation such that said specified aerodynamic parameter is within a specified optimal range to improve a performance of said rotor.

These and other embodiments, aspects and advantages of the invention will become more apparent in light of the following detailed description, including the accompanying drawings and appended claims.

DETAILED DESCRIPTION OF THE INVENTION

The design methods and blade configurations disclosed herein are based on symmetry arguments and perturbations to eigenvalues and eigenvectors of the stability or forced response matrix for a rotor with mistuned blades. Breaking of a discrete circumferential symmetry will be assumed but the design methods are applicable to other symmetries. The embodiments will be explained with reference to two applications: (1) for a given set of mistuned blades, find a blade spatial distribution that optimizes the stability and/or forced response of the mistuned rotor; and (2) for a given tolerance range of blade mistuning, design mistuned blades within the tolerance range and a mistuned blade spatial configuration such that the stability and/or forced response are optimized.

Various aspects of the invention are disclosed by Shapiro in "Optimal Mistuning: An Analysis of Flutter Boundaries in Turbomachines," Proceedings of Joint Propulsion Conference 33rd AIAA/ASME/SAE/ASEE (July, 1997), which is incorporated herein by reference.

1. Mistuned Blades for Optimized Stability

Figure 1:
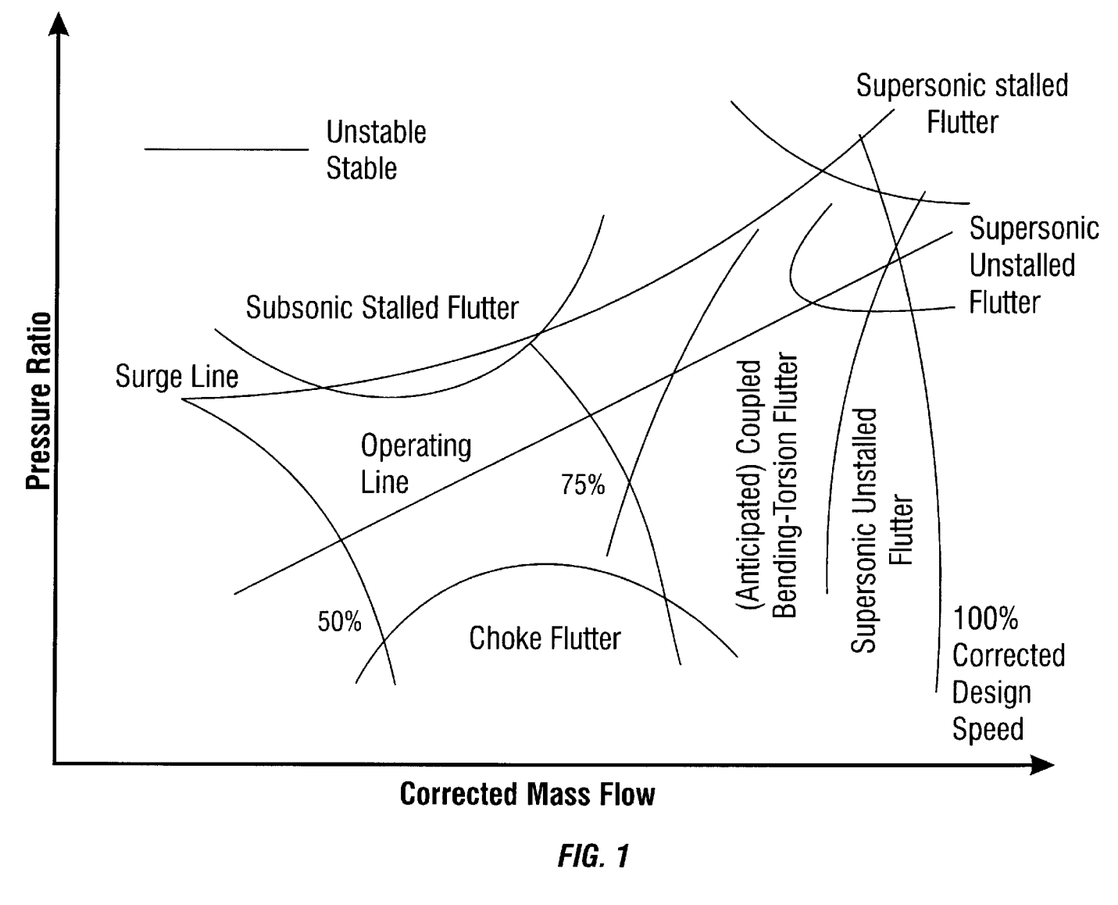
FIG. 1 is a chart showing typical flutter boundaries of a compressor rotor.

This aspect of the invention will be described with a specific reference to flutter stability of mistuned blades. Fluttering of blades exist in a wide range of operating conditions of a turbomachine under different pressure ratios and mass flows. FIG. 1 is a compressor map showing typical flutter boundaries in a turbomachine. See, Bendiksen, "Recent developments in flutter suppression techniques for turbomachinery rotors," Journal of Propulsion, Vol. 4(2), pp. 164–171 (1986). Increasing flutter stability boundaries can increase the performance of a turbomachine.

Consider a rotor with r blades. If all r blades are identical to one another, this rotor has a circumstantial symmetry of $2\pi/r$. Upon mistuning, this symmetry is broken. Finding the stability boundary as a function of arbitrary mistuning is equivalent to finding ($r/2+2$) stability coefficients. The symmetry arguments used in the analysis are independent of models so that any model, including dynamical system, computational fluid dynamic (CFD) and sinusoidal imposed motion, may be used. A dynamical system model is assumed to simplify the analysis.

Furthermore, symmetry arguments may be used to reduce relevant optimization problems to standard quadratic programming problems with linear constraints. It is practical to find global optimums for stability problems for rotors having up to or less than 30 blades by applying a branch and bound software. One example of such software is developed by Al-Khayyal et al. "A relaxation method for nonconvex quadratically constrained quadratic programs," Journal of Global Optimization, Vol. 6(3), pp. 215–230 (1995), which is incorporated herein by reference.

Assume a parameter $z_i$ denotes mistuning for the ith blade of a rotor. For example, if the stiffness is mistuned, then the stiffness of the ith blade $k_i$ can be expressed by a mistuning parameter $z_i$ by $k_i = k_0(1+z_i)$ where $k_0$ is the stiffness of a tuned blade or a nominal stiffness. The mistuning parameters $\{z_i\}$ for all blades form a mistuning vector $z$ in a vector space $R^r$. The mistuning vector $z$ is defined in such a way that $z=0$ corresponds to a tuned case. The following derives the relation between the stability of the model and the mistuning vector $z$ for any dynamical system model.

Consider a dynamical system model defined by a function $f$:

$$x = f(x, U, z), \tag{1}$$

where x is a state vector of n components which indicates the aeromechanical state of the model ($x \in R^n$), and $U \in R$ is a loading parameter representing throttle, Mach number (i.e., ratio of the fluid velocity over the sound speed), reduced frequency, or rotor speed. In general, f may be any discrete blade model and can include a computational fluid dynamics (CFD) model. Although a dynamical system model will be assumed to illustrate the invention, the symmetry arguments presented herein apply more generally and are valid for any model with symmetry, symmetry breaking and a stability boundary.

For any mistuning z, a variation in the loading parameter U within a certain operating range $[U_0, U_1]$ yields a set of equilibrium states $X_0(U,z)$ for the dynamic system model in Equation (1):

$$X_0(U,z) = \{x_0 : f(x_0, U, z) = 0, U \in [U_0, U_1]\}. \tag{2}$$

Assume that $X_0(U,z)$ has at least one equilibrium state $x_0$, i.e., $f(x_0, U, z)=0$, for z in some neighborhood of the origin $z=0$ and for all U in $[U_0, U_1]$. This equilibrium $x_0(U,z) \subset X_0(U,z)$ can be selected to correspond to the equilibrium point of interest at each U. For example, the model in Equation (1) may represent a tuned jet engine with $z=0$ and U is the throttle that varies in $[U_0, U_1]$. Then $x_0(U,0)$ is a design operating point as a function of throttle setting U.

The z dependence in $x_0(U,0)$ is essential here. In the example of stiffness mistuning in which different blades have different stiffness values, the respective nominal (or static) deflections of the mistuned blades are no longer equal. This implies that the mistuned equilibrium point is not equal to the tuned equilibrium point $x_0(U,z) \neq x_0(U,0)$ when $z \neq 0$.

A damping parameter $h(U,z)$ can be defined to indicate the stability of $x_0(U,z)$ as a function of U for a fixed mistuning z:

$$h(U,z) = \max[Re(\lambda(U,z))], \tag{3}$$

where $\lambda(U,z)$ represents a set of eigenvalues of $\partial f[x_0(U,z), U, z]/\partial x$. When $h(U,z)$ is negative, then the equilibrium point $x_0(U,z)$ is stable; otherwise, $x_0(U,z)$ is unstable.

Assume the model is initially in a stable state, $h(U,z)<0$. As the loading parameter U increases within $[U_0, U_1]$, $\partial f[x_0(U,z), U, z]/\partial x$ changes accordingly. At some point $U_{crit} \in [U_0, U_1]$, the right-most eigenvalue of $\partial f[x_0(U,z), U, z]/\partial x$ touches the right half of the complex plane, i.e., $h(U_{crit}, z)=0$. If U further increases so that $h(U,z)$ becomes positive, the system becomes unstable. Therefore, $h(U_{crit}, z)=0$ defines the stability boundaries of the model in Equation (1). Hence, $U_{crit}$ can be defined as:

$$U_{crit}(z) = \min\{u : h(U,z)=0\}, U \in [U_0, U_1] \tag{4}$$

when $h(U,z)$ changes from a negative to positive as U increases. If $h(U,z)$ does not cross the origin for $U \in [U_0, U_1]$ then let $U_{crit}(z) = \pm\infty$ with appropriate choice of sign. When the system loses stability as U decreases the "min" in Equation (4) should be replaced with a "max". Also, if there is more then one stability boundary of interest, the interval $[U_0, U_1]$ may be appropriately partitioned so that only one boundary is under consideration.

Figure 2:
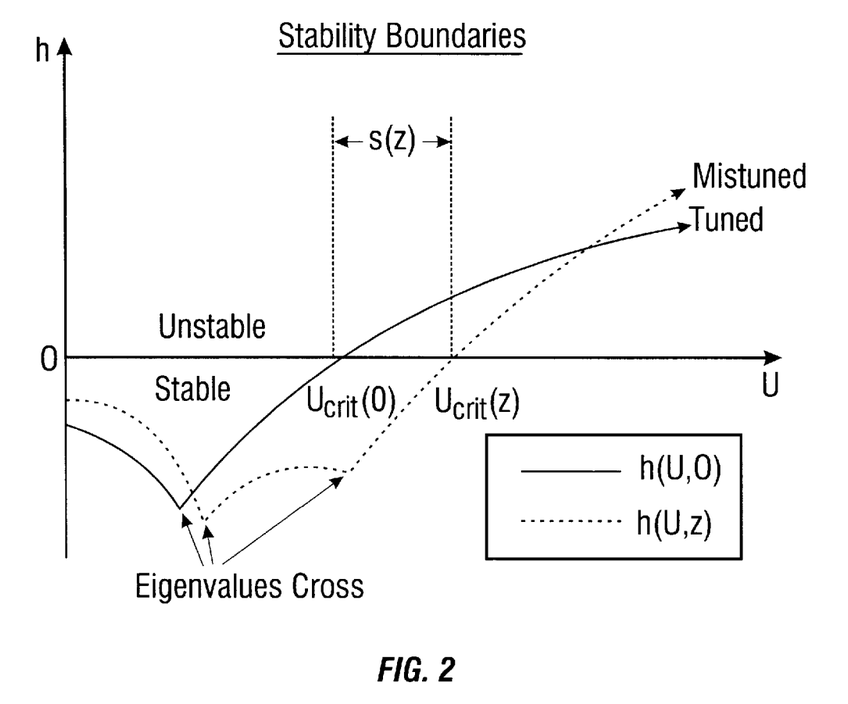
FIG. 2 is a chart showing the damping parameter as a function of the loading in which stability boundaries are illustrated.

A stability parameter $s(z)$ can be defined to indicate a change in the stability boundary as a function of the mistuning z:

$$s(z) = +[U_{crit}(z) - U_{crit}(0)], \tag{5}$$

where the positive sign is replaced with a negative if instability occurs as U decreases. FIG. 2 is a graphic representation of the stability parameter $s(z)$.

The loading parameter U may vary with time. For example, U can be the Mach number which varies with external disturbances and when blades sweep past stators and inlet guide vanes. However, a time dependent loading U(t) can be considered as including an averaged part U and perturbed part U'(t): U(t)=U+U'(t). The steady part U leads to the study of stability while the unsteady part U'(t) represents the forced response or mode localization problem which will be described later.

Two general assumptions are made in here so that the actual aeromechanical conditions in turbomachines can be approximately treated.

Smoothness Assumption: The stability parameter s(z) is three times differentiable in some sufficiently large neighborhood of the origin, $S \in C^3(\Omega)$.

Smoothness is necessary for performing derivative operations with respect to z. In models of turbomachines, this assumption requires that conditions in the turbomachines change continuously and smoothly with z. This assumption holds for most models of turbomachines. Therefore, this assumption does not limit the applicability of the methods and blade configurations. The above assumption also requires that the analysis holds in some sufficiently large region $\Omega$ about the origin (tuned case) so that predicted shifts in stability hold for a physically practical range of mistuning values z. The above assumption is a technical condition which can be relaxed in a more detailed analysis. Such an extension typically requires the tracking of multiple eigenvalues.

The second assumption concerns the symmetry arguments used in the methods and blade configurations and can generally be applicable to all rotors in turbomachines.

Symmetry Assumption: The minimum damping h(U,z), and hence the stability parameter s(z), are invariant under rotations of z, i.e., $$h(U, z) = h(U, \varphi^k[z]), \forall U, z, \forall k \in (1, 2, \ldots, r-1) \quad (6)$$

$$\Rightarrow s(z) = s(\varphi^k[z]), \forall k \in (1, 2, \ldots, r-1) \quad (7)$$

where $\varphi^k[z_1 z_2, \ldots, z_r] = [z_{1+k}, z_{2+k}, \ldots, z_r, z_1, \ldots, z_k]$ is a rotation operator.

This symmetry assumption requires a system to exhibit identical aeromechancial behaviors if a mistuning by an amount $\epsilon$ in any one blade is replaced the same mistuning $\epsilon$ in any other blade. For example, mistuning the first blade or the third blade by $\epsilon$ should be the same: $s(\epsilon,0, \ldots ,0)=s(0, 0,\epsilon,0, \ldots , 0)$. Alternatively, a rotation of z corresponds to a circular renumbering of blades and does not change the stability of the system. Since labeling schemes are arbitrary, stability cannot be changed by such renumbering. The stability s(z) is therefore invariant under rotation.

Any practical rotor can be considered a nominal or theoretically perfectly tuned rotor with a small perturbation mistuning δ. An intentional perturbation ξ larger than δ can be introduced for investigating the effect of mistuning on the stability. This results in a total mistuning z=δ+ξ in a practical rotor. Therefore, the symmetry assumption is applicable to z.

In addition, mistuning is a second order effect (possibly with large quadratic coefficients) as will be explained later. Thus, the effects of sufficiently small (zero average) imperfections δ on stability are usually negligible.

Figure 3:
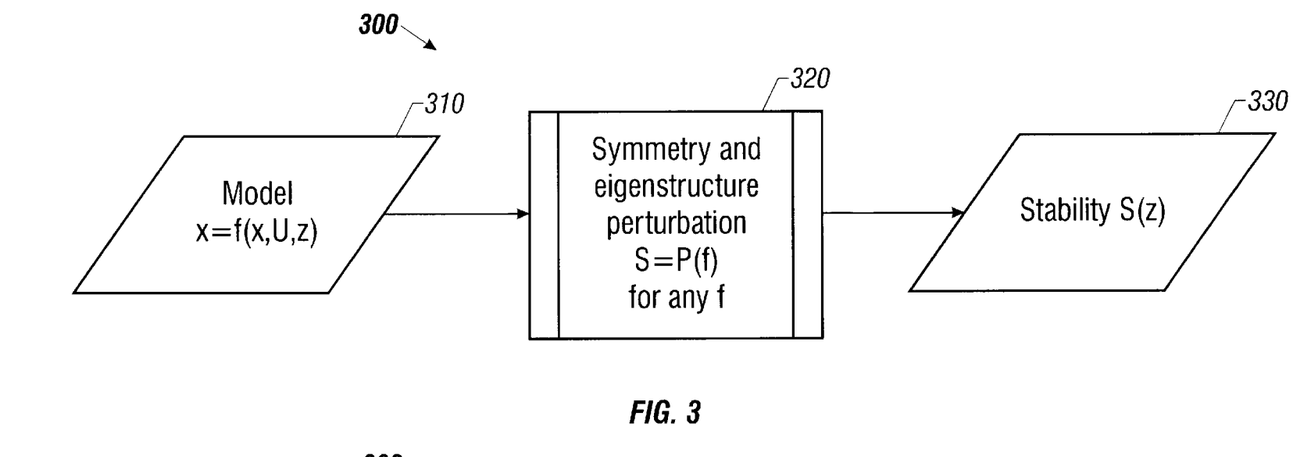
FIG. 3 is a flowchart showing a process of the stability optimization according to the invention.

The above assumptions establish necessary tools for determining the stability parameter s(z) for a given mistuning z. Forced responses due to mistuning is assumed to be acceptable for this analysis and will be analyzed in detail later. Symmetry arguments and eignestructure perturbation will be used to determine a relation between the stability parameter s(z) and the mistuning z. This is illustrated in FIG. 3.

The smoothness assumption allows for an expansion of the stability parameter s(z) about the origin (z=0):

$$s(z_1, \ldots, z_r) = \sum_{i=1}^{r} a_i z_i + \sum_{i,j=1}^{r} b_{ij} z_i z_j + O(\|z\|^3), \quad (8)$$

where the expansion coefficients $a_i$ and $b_{ij}$ determine the stability s(z) and the power expansion holds in a region less than $\Omega$ set by the smoothness assumption. Let $\Theta$ be a subset of $\Omega$ in which s(z) can be accurately approximated by second order terms in z. It is additionally assumed that this smaller set $\Theta$ is still sufficiently large to be of practical interest; otherwise analysis can be extended to include third and fourth order terms.

The number of independent expansion coefficients in Equation (8) can be reduced by using the symmetry assumption, i.e., $s(z)=s(\varphi^k(z))$ for any integer k. The following can be obtained for all $\epsilon$ up to $O(\epsilon^3)$ $$a_1\epsilon+b_{11}\epsilon^2=a_2\epsilon+b_{22}\epsilon^2= \ldots =a_r\epsilon+b_{rr}\epsilon^2, \quad (9)$$

$$a_i=a_j \quad (10)$$

$$b_{ii}=b_{jj} \quad (11)$$

$$b_{ij}+b_{ji}=b_{[i+k][j+k]}+b_{[j+k][i+k]} \quad (12)$$

for all i, j, and k, where [ ] denotes modulus of the number of objects (e.g., blades), r.

The expansion coefficients $a_i$ and $b_{ij}$ can be renamed as the following coefficients:

$$a \triangleq a_1 = a_2 = \ldots = a_r, \quad (13)$$

$$b \triangleq b_{11} = b_{22} = \ldots = b_{rr}, \quad (14)$$

$$c_1 \triangleq b_{12} + b_{21} = b_{23} + b_{32} = \ldots = b_{[r-1]1} + b_{1[r-1]} = b_{r1} + b_{1r}, \quad (15)$$

$$c_2 \triangleq b_{13} + b_{31} = b_{24} + b_{42} = \ldots = b_{[r-1]2} + b_{2[r-1]} = b_{r2} + b_{2r}, \quad (16)$$

$$\vdots$$

$$c_k \triangleq b_{1[1+k]} + b_{[1+k]1} = \ldots = b_{rk} + b_{kr}, \quad (17)$$

where k is defined in the remainder as $$k \triangleq \begin{cases} \dfrac{r}{2}, & r \text{ even;} \\ \dfrac{r-1}{2}, & r \text{ odd.} \end{cases} \quad (18)$$

The stability parameter s(z) of Equation (8) can now be written as:

$$s(z) = a(z_1 + z_2 + \ldots + z_r) + \quad (19)$$

-continued $$b(z_1^2 + z_2^2 + \ldots + z_r^2) +$$
$$c_1(z_1z_2 + z_2z_3 + \ldots + z_rz_1) +$$
$$c_2(z_1z_3 + z_2z_4 + \ldots + z_rz_2) +$$
$$\vdots \qquad \vdots$$
$$c_k(z_1z_1 + k + z_2z_2 + k + \ldots + z_rz_k) + O(\|z\|^3).$$

Thus, $s(z)$ is invariant under rotation and has leading order quadratic terms if $(z_1+z_2+\ldots+z_r)=0$. Equation (19) can be written in a compact form:

$$s(z) = a \sum_{i=1}^{r} z_i + z'Sz + O(\|z\|^3), \qquad (20)$$

where $z'$ is the transpose of $z$ and the matrix $S$ is defined as $$S = \begin{bmatrix} b & \frac{c_1}{2} & \frac{c_2}{2} & \ldots & c_k & \ldots & \frac{c_2}{2} & \frac{c_1}{2} \\ \frac{c_1}{2} & b & \frac{c_1}{2} & \frac{c_2}{2} & \ldots & c_k & \ldots & \frac{c_2}{2} \\ \frac{c_2}{2} & \frac{c_1}{2} & b & \frac{c_1}{2} & \frac{c_2}{2} & \ldots & c_k & \ldots \\ \ldots & & & & & & & \\ \frac{c_1}{2} & \frac{c_2}{2} & \ldots & c_k & \ldots & \frac{c_2}{2} & \frac{c_1}{2} & b \end{bmatrix}, r \text{ even;} \qquad (21)$$

$$S = \begin{bmatrix} b & \frac{c_1}{2} & \frac{c_2}{2} & \ldots & \frac{c_k}{2} & \frac{c_k}{2} & \ldots & \frac{c_2}{2} & \frac{c_1}{2} \\ \frac{c_1}{2} & b & \frac{c_1}{2} & \frac{c_2}{2} & \ldots & \frac{c_k}{2} & \frac{c_k}{2} & \ldots & \frac{c_2}{2} \\ \frac{c_2}{2} & \frac{c_1}{2} & b & \frac{c_1}{2} & \frac{c_2}{2} & \ldots & \frac{c_k}{2} & \frac{c_k}{2} & \ldots \\ \ldots & & & & & & & & \\ \frac{c_1}{2} & \frac{c_2}{2} & \ldots & \frac{c_k}{2} & \frac{c_k}{2} & \ldots & \frac{c_2}{2} & \frac{c_1}{2} & b \end{bmatrix}, r \text{ odd.} \qquad (22)$$

The matrix $S$ is real, symmetric and cyclic as a result of the symmetry assumption.

Equation (20) indicates that the symmetry assumption reduces a problem of finding stability boundaries based on a mistuning $z$ to determining $(r/2+2)$ stability coefficients. Once the cofficients $a$, $b$, $c_1$, $c_2$, ..., $c_k$ are determined, the stability parameter $s(z)$ can be solved up to second order in $z$. This dramatically reduces the complexity of the problem. Mistuning is a second order effect because the linear term in Equation (20) corresponds to a tuned condition.

Equation (20) is independent of the model type and is valid for any model including dynamical system, imposed sinusoidal motion or CFD models. The only requirement is a $2\pi/r$ rotation symmetry group.

The term $z'Sz$ in Equation (20) also has a sign and reflection symmetry. Specifically, $z'Sz$ is invariant under the following mapping operations $z \rightarrow -z$ and $(z_1, z_2, \ldots, z_r) \rightarrow (z_r, z_{r-1}, \ldots, z_2, z_1)$. Thus, for a zero average mistuning, the sign and reflection appear as third-order effects. So there is a hierarchy of stability effects; tuned (average) terms appear in the first order, zero average mistuning is a second-order phenomenon and mistuning reflection is of third order.

The stability coefficients $a$, $b$, $c_1$, $c_2$, ... $c_k$ in Equation (20) can be determined by the derivatives of eigenvalues of the following Jacobian matrix $M(U,z)$:

$$M(U, z) \triangleq \frac{\partial f}{\partial x}(x_0(U, z), U, z). \qquad (23)$$

Only the information at $z=0$ (the tuned case) is needed and the results can be adjusted for different types of mistuning with a minimum of computation.

The damping parameter $h(U,z)$ defined in Equation (3) can be expanded about $U_{crit}(0)$ for any $z$ in $\Omega$:

$$h(U, z) = h(U_{crit}(0), z) + \left[\frac{\partial h}{\partial U}(U_{crit}(0), z)\right](U_{crit}(0)) + \qquad (24)$$
$$\frac{1}{2}\left[\frac{\partial^2 h}{\partial U^2}(U_{crit}(0), z)\right](U - U_{crit}(0))^2 + O(U - U_{crit}(0))$$

This can be used to derive the coefficients a, b, and ci based on the smoothness and symmetry assumptions:

$$a = \frac{\{\partial \lambda_p / \partial z_1\}}{\{\partial \lambda_p / \partial U\}}, \qquad (25)$$

$$b = \frac{1}{\{\partial \lambda_p / \partial U\}}\left(-\left\{\frac{\partial^2 \lambda_p}{\partial z_1^2}\right\} + \qquad (26)\right.$$
$$\left.\frac{\{\partial \lambda_p / \partial z_1\}}{\{\partial \lambda_p / \partial U\}}\left[\left\{\frac{\partial^2 \lambda_p}{\partial U \partial z_1}\right\} - \frac{\{\partial \lambda_p / \partial z_1\}\{\partial^2 \lambda_p / \partial U^2\}}{2\{\partial \lambda_p / \partial U\}}\right]\right),$$

$$c_i = \frac{1}{\{\partial \lambda_p / \partial U\}}\left(-\left\{\frac{\partial^2 \lambda_p}{\partial z_1 \partial z_{1+i}}\right\} + \qquad (27)\right.$$
$$\left.\frac{\{\partial \lambda_p / \partial z_1\}}{\{\partial \lambda_p / \partial U\}}\left[\left\{\frac{\partial^2 \lambda_p}{\partial U \partial z_1}\right\} - \frac{\{\partial \lambda_p / \partial z_1\}\{\partial^2 \lambda_p / \partial U^2\}}{2\{\partial \lambda_p / \partial U\}}\right]\right),$$

where $\lambda_p$ is the least stable eigenvalue (i.e., having the maximal real part) of $M(U_{crit}(0),0)$, all derivatives are evaluated at $(U,z)=(U_{crit}(0),0)$, and $\{x\}$ denotes the real part of $x$.

The derivatives in Equations (25)–(27) can be computed using the computation techniques by Lancaster, in "On eigenvalues of matrices dependent on a parameter," Numerische mathematick, Vol. 6, pp. 377–387 (1964). Specifically, the symmetric derivatives in Equations (25)–(27) can be expressed as derivatives with respect to $\mu$ representing any of $z_1, z_2, \ldots, z_r$ or U:

$$\frac{\partial \lambda_p}{\partial \mu}(U_{crit}(0), 0) = \rho_{pp}, \qquad (28)$$

$$\frac{\partial^2 \lambda_p}{\partial \mu^2}(U_{crit}(0), 0) = U_p\left[\frac{\partial^2 M}{\partial \mu^2}(U_{crit}(0), 0)\right]V_p + 2\sum_{k \in I}\frac{\rho_{pk}\rho_{kp}}{\lambda_p - \lambda_k}, \qquad (29)$$

and $$\Gamma = \{k : \lambda_k(U_{crit}(0), 0) \neq \lambda_p(U_{crit}(0), 0), k \in (1, 2, 3, \ldots, rm)\}, \qquad (30)$$

where $\rho_{ij}$ is given by $$\rho_{ij} = U_i \frac{\partial M(U_{crit}(0), 0)}{\partial \mu} V_j, \qquad (31)$$

in which $U_i$, $V_i$ are the ith left and right eigenvectors of $M(U_{crit}(0),0)$.

The asymmetric derivatives can be calculated as follows:

$$\frac{\partial^2 \lambda_p}{\partial \mu \partial \nu}(U_{crit}(0), 0) = \tag{32}$$

$$\frac{1}{2}\left(\frac{\partial^2 \lambda_p}{\partial \eta^2}(U_{crit}(0), 0) - \frac{\partial^2 \lambda_p}{\partial \mu^2}(U_{crit}(0), 0) - \frac{\partial^2 \lambda_p}{\partial \nu^2}(U_{crit}(0), 0)\right),$$

where $\nu$ is $z_1, z_2, \ldots, z_r$ or U and $\eta$ is a variation in both $\nu$ and $\mu$ (set both $\nu$ and $\mu$ equal to $\eta$). Equation (32) can be calculated using the symmetric partials according to Equation (29). For example, $\partial^2 \lambda_p / \partial z_1 \partial z_2$ can be calculated by setting $\mu$ to $z_1$, $\nu$ to $z_2$ and $\eta$ to both $z_1$, $z_2$, respectively:

$$\frac{\partial^2 \lambda_p}{\partial \eta^2} = \frac{\partial^2 \lambda_p}{\partial z_1^2} + \frac{\partial^2 \lambda_p}{\partial z_2^2} + 2\frac{\partial^2 \lambda_p}{\partial z_1 \partial z_2}. \tag{33}$$

Equations (28), (29), and (32) can be calculated by solving an m×m eigenvalue/vector problem r times with resulting computation time $rm^3$ where m is the number of states per blade. This reduces computational complexity by $r^2$.

Figure 4:
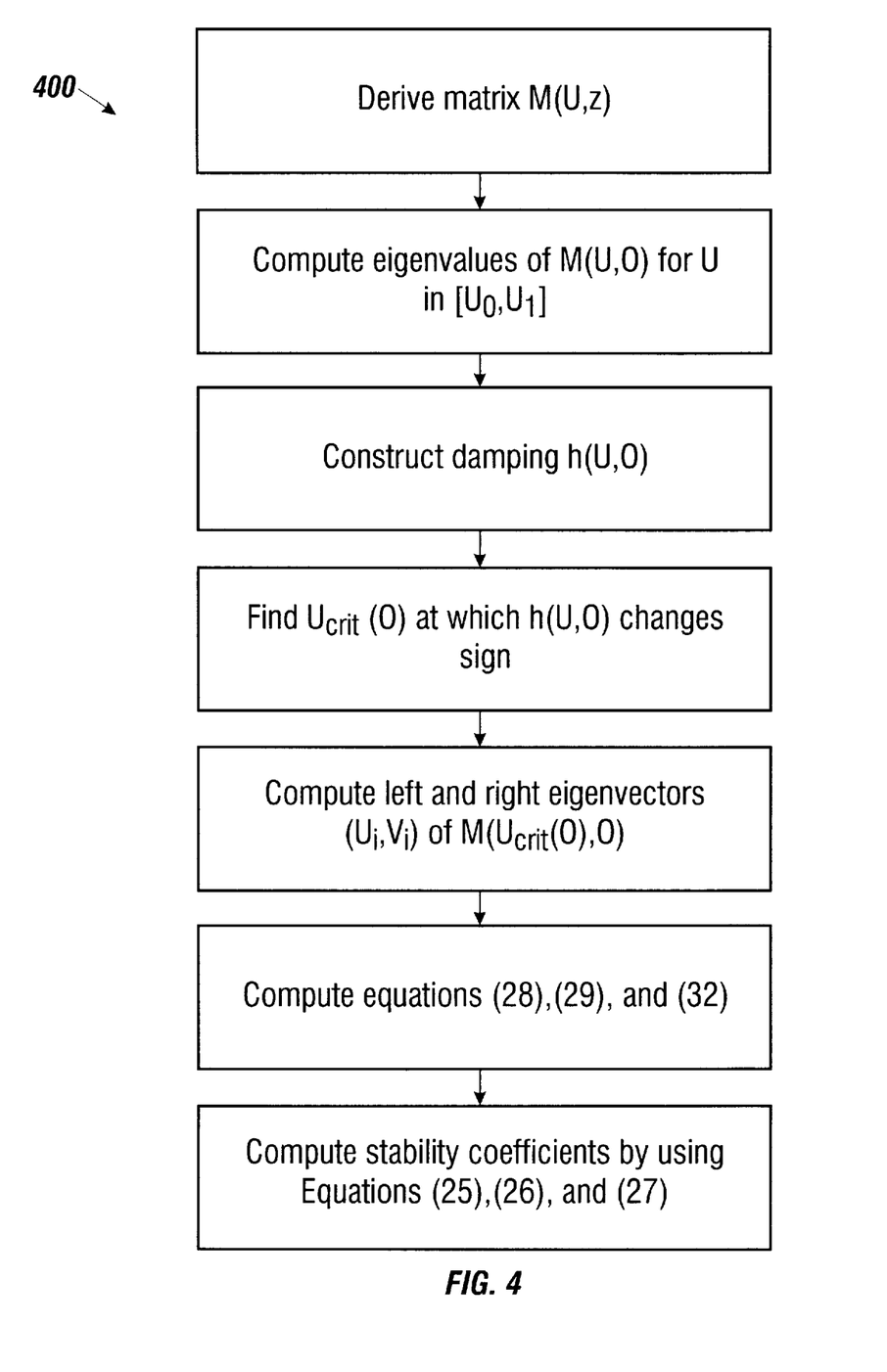
FIG. 4 is a flowchart showing a process of determining stability coefficients by computing eigenvalue derivative of a linear matrix.

FIG. 4 is flowchart showing the above process for determining the stability coefficients of any dynamic system model.

The above process shown in FIG. 4 may not be applicable to some complex models that have a large number of states. In such complex models such as computational fluid dynamics models, the derivatives of the eigenvalues for the Jacobian matrix M(U,z) in Equation (23) may not be easily computed. However, for such a complex model defined by Equation (1), a finite difference technique can be used to estimate the stability coefficients $a, b, c_1, \ldots, c_k$. This allows for an accurately prediction of the stability s(z) for any given mistuning z.

Assume a model as defined in Equation (1) is chosen in such a way that meaningful second order finite differences may be formed. Thus, from Equation (8), the stability coefficients can be rewritten as $$a = \frac{\partial s}{\partial z_1}(0) \approx \frac{s(\epsilon, 0, \ldots, 0)}{\epsilon}, \tag{34}$$

$$b = \frac{1}{2}\frac{\partial^2 x}{\partial z_1^2}(0) \approx \frac{s(2\epsilon, 0, \ldots, 0) - 2s(\epsilon, 0, \ldots, 0)}{2s\epsilon^2}, \tag{35}$$

$$c_i = \frac{\partial^2 s}{\partial z_1 \partial z_{1+i}}(0) \approx \frac{s(\epsilon, 0, \ldots, 0, \epsilon, \ldots, 0) - 2s(\epsilon, 0, \ldots, 0)}{\epsilon^2}. \tag{36}$$

The second $\epsilon$ in the term, $s(\epsilon, 0, \ldots, 0, \epsilon, \ldots, 0)$, in Equation (36) appears in the (i+1)th spot and $\epsilon$ is small. The model in Equation (1) needs to be run a total of (r/2+2) times to form the right-hand side of Equations (34)–(36) for computing the coefficients. Once these runs have been completed, the analysis question is solved and the effect of all other types of mistuning is known up to second-order in z. This process may be susceptible to numerical noise which may cause large errors when attempting to numerically determine second-order derivatives.

The above two different methods for evaluating the stability coefficients establish a relation of the stability parameter s(z) with the mistuning z. Thus, for a given z, the stability behavior can be determined. This allows for determination whether mistuning is beneficial and the optimal mistuning for extending the stability boundaries.

Mistuning can appear in a number of types, including but not limited to, blade stiffness, blade angle of attack, stator shape, and cowling clearance. One may choose any suitable mistuning. However mistuned, the stability extension s(z) should be increased or maximized while keeping the side effects of mistuning acceptable, such as the forced response.

Mistuning can lead to difficult optimization problems. For example, suppose n blades are made and these blades have a set of mistuning values (say stiffness variations) $y_1, y_2, \ldots, y_n$ due to machining tolerances. Given the stability coefficients $a, b, c_1, c_2, \ldots, c_k$ and assuming $y_i$'s are known or measurable, what is arrangement of the r blades that maximizes stability?

Conventional approaches would have to check n!/(n−r)! possibilities. This is not practical for large r or n; even the special case n=r requires r! operations.

According to the present invention, this is can be done by the global optimization of Equation (8). This can be performed by using known optimization software such as CLPEX or the branch and bound software by Al-Khayyal et al, supra. This usually involves complex and lengthy computation. However, this approach is still much faster than running a model n!/(n−r)! times.

One aspect of the invention is to use certain structure in a model defined by Equation (1), in addition to the symmetry assumption, to significantly simplify certain mistuning optimization problems. Consider the set of models where stability coefficients satisfy the following relation:

$$c_1 > c_2 > \ldots > c_{k-1} > c_k, r \text{ odd}, \tag{37}$$

$$c_1 > c_2 > \ldots > c_{k-1} > 2c_k, r \text{ even}. \tag{38}$$

The above condition can be applicable to many models. The optimization of Equation (8) can then be solved in closed form.

Such optimization problem is not restricted to mistuning applications. Similar optimization issues arise in optimal arrangement of digital records to be searched in computer science. See, Knuth, "Sorting and searching," Page 405, Q18 and Q20, in Vol. 3 of *The Art of Computer Programming*, Addison-Wesley(1973), which is incorporated herein by reference. Knuth provides a solution to an optimization problem in sorting digital files. In particular, it is recognized that Knuth's solution can be applied to solve the optimization of the Equation (8) if the coefficients meet the condition in Equations (37) and (38).

Based on Knuth's solution, optimal solutions are all rotations and reflections of a "pyramid" arrangement. For a given mistuning $z=(z_1, z_2, \ldots, z_r)$, the optimal arrangement of blades to achieve maximum stability parameter s(z) in Equation (8) is:

$$z_{k+1} \geq z_k \geq z_{k+2} \geq z_{k-1} \geq \ldots \geq z_{r-1} \geq z_2 \geq z_r \geq z_1, \tag{39}$$

for r even; or $$z_{k+1} \geq z_k \geq z_{k+2} \geq z_{k-1} \geq \ldots \geq z_2 \geq z_{r-1} \geq z_1 \geq z_r, \tag{40}$$

for r odd. Therefore, computational complexity is reduced from an intractable number r! to a much more tractable number, (r log r), which is the sorting time for r objects. The above solution in Equations (39) and (40) can be proved by following Knuth's method. See, Shapiro, supra.

Figure 5:
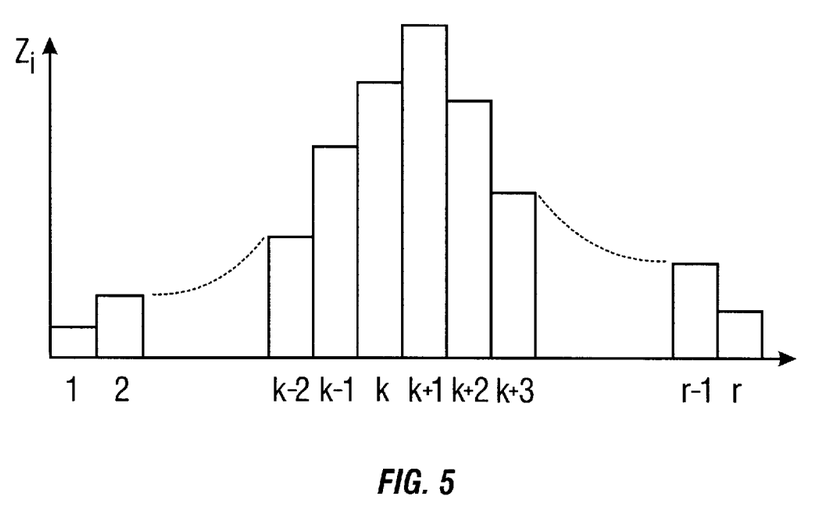
FIG. 5 is a chart showing one optimized blade arrangement according to the invention.

FIG. 5 illustrates an optimal solution for an even number of blades. The positions in the horizontal axis represent evenly spaced blade positions around the rotor disk.

The above stability optimization based on mistuning can be applied to two types of rotor design problems. First, the stability optimization provides a blade arrangement to achieve a maximum stability boundary for a given set of mistuned blades. Second, a set of blades can be designed to have intentional mistunings to achieve a maximum stability boundary based on an arrangement determined by the stability optimization.

In addition, the same analysis based on symmetry and eigenstructure perturbation can be applied to achieve a desired forced response of mistuned blades.

2. Mistuned Blades for Optimized Forced Response

Random mistuning in rotor blades has been recognized as a factor for causing unacceptable forced response which can lead to failure of a rotor. Intentional mistuning can provide benefits such as improved stability as described above.

It is further contemplated that a proper choice of mistuning can not only improve the stability but also improve the worst case forced response under manufacturing uncertainty and wear. Now the additional random mistuning caused by manufacturing and wear will not lead to unacceptable forced response. The above-described analysis method can be used to determine a relation between a forced response and a mistuning vector. This relation can then be used to determine a proper mistuning that leads to a desired robust forced response.

Figure 6:
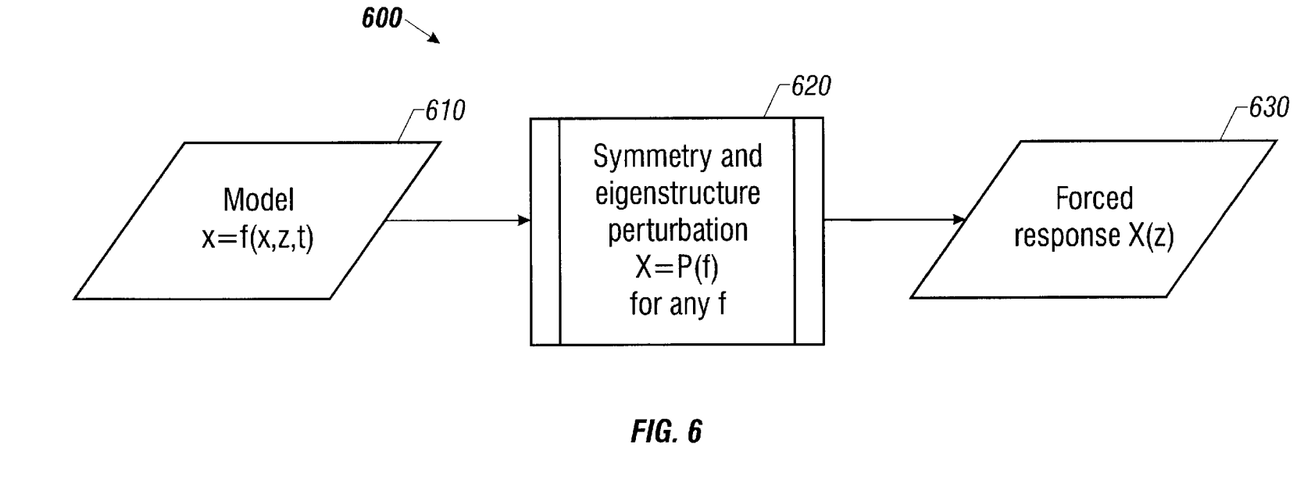
FIG. 6 is a flowchart showing a process of the optimization of the forced response according to the invention.
Figure 7:
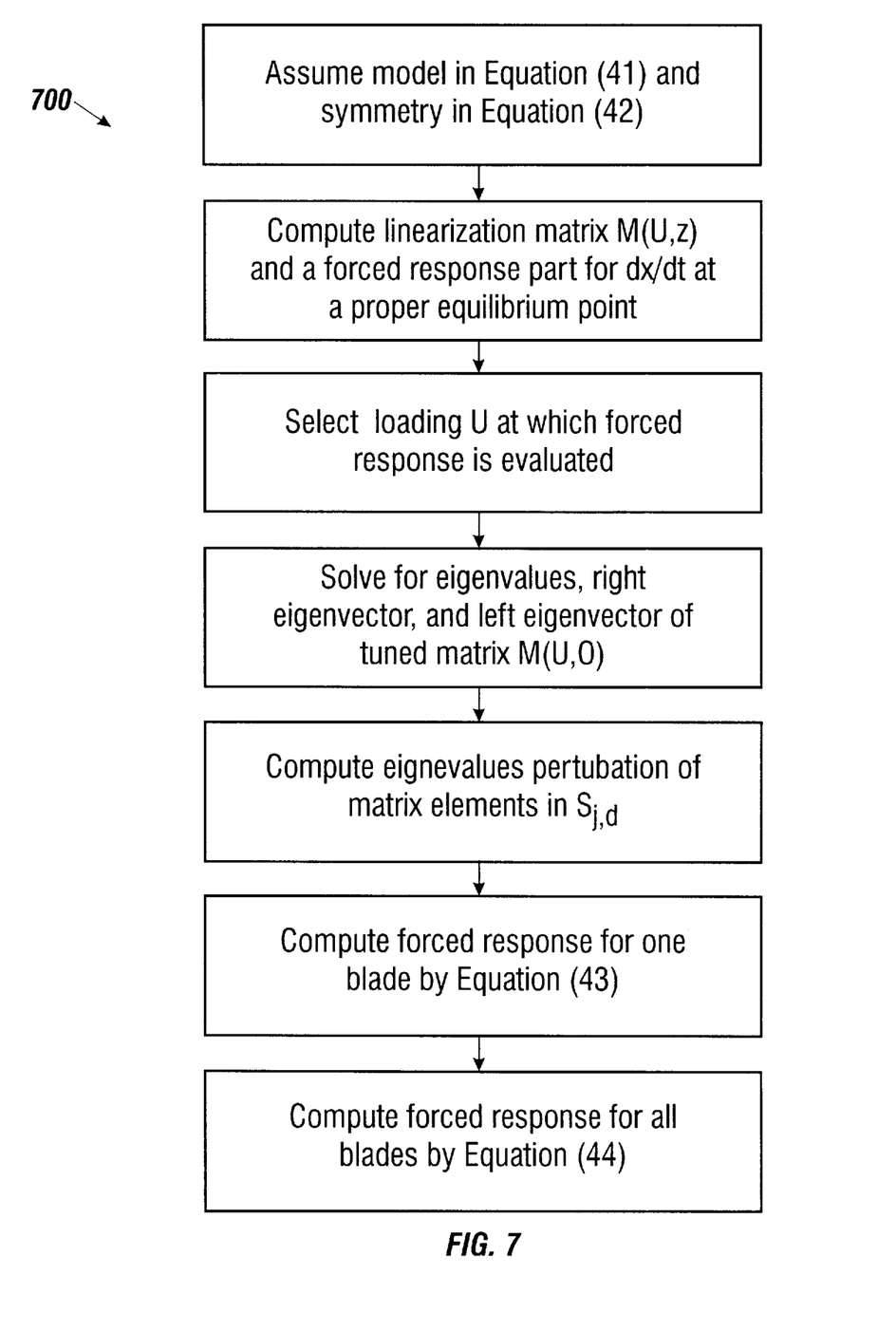
FIG. 7 is a flowchart showing a process of determining forced response as a function of mistuning by computing eigenvalue derivative of a linear matrix.

FIG. 6 shows an analysis process similar to that in FIG. 3 for stability optimization. At step 610, a system model is selected. At step 620, the symmetry arguments based on the above symmetry assumption and eigenstructure perturbation are used to determine the dependence of a forced response on the mistuning. At step 630, an expression for forced response as a function of mistuning z is obtained and can be analyzed to obtain information on sensitivities and design tradeoffs. Computation complexity can be significantly reduced as shown in the stability optimization analysis. Since the method is independent of models, information on how sensitivity to mistuning varies with parameters and between models can be obtained.

The smoothness and symmetry assumptions in the stability optimization analysis are also used here. For a mistuning vector $z \in R^r$, consider a dynamical system model defined by a function f:

$$\dot{x} = f(x, U, z, t), \quad (41)$$

where $x = (x_1, x_2, \ldots, x_r) \in R^{rm}$ is a state vector with $x_i \in R^m$ of indicating the aeromechanical states of the ith blade, $U \in R$ is a loading parameter, and t is time indicating that the forced response is dependent on time. In general, f may be any discrete blade model and can include a computational fluid dynamics model. Although a dynamical system model will be assumed to illustrate the invention, the symmetry arguments presented herein apply more generally and are valid for any model with symmetry, symmetry breaking and a stability boundary.

Assume the model in Equation (1) has a rotation symmetry with respect to a rotation operator $\phi$:

$$\phi f(x, U, z, t) = f(\phi x, U, \phi z, t+\tau), \quad (42)$$

where $\tau$ is a time lag due to the rotation operation by $\phi$. This assumption is a natural analog of the stability symmetry assumption and states that changing blade one and observing blade two is the same as changing blade three and observing blade four. The forced responses for the first blade and all blades can be approximated as:

$$X_1(z) = \sum_{j=0}^{r-1} \sum_{d=1}^{m} X_1^{j,d}(z) + \sum_{j=0}^{r-1} \sum_{d=1}^{m} \frac{\alpha_0^{j,d} + \alpha_1^{j,d} z_1 + \alpha_2^{j,d} z_2 + \ldots + \alpha_r^{j,d} z_r}{i\omega - \lambda_j^d(0) - a_{j,d} \sum_{i=1}^{r} z_i - z^T[S_{j,d}]}, \quad (43)$$

with $$X(z) = [X_1(z), p_1 X_1(\phi z), p_1^2 X_1(\phi^2 z), \ldots, p_1^{r-1} X_1(\phi^{r-1} z)], \quad (44)$$

where $S_{j,d}$ is a matrix similar to the matrix S defined in Equations (21) and (22), and all other coefficients $\alpha$, $\lambda$ and p are known.

Optimization of the forced response X(z) for a mistuning z is essentially the same as optimization of the stability parameter s(z). All solutions for the stability s(z) can be used for X(z).

Similar to the stability optimization, the optimization of the forced response based on mistuning can be applied to two types of rotor design problems. First, for a given set of blades, the optimization of the forced response provides a blade arrangement to guarantee a specified acceptable forced response under given manufacturing tolerances and wear by normal operation. Hence, by introducing intentional mistuning, the forced response remains below the acceptable level for an additional random mistuning within the range of manufacturing tolerances. Second, a set of blades can be designed to have intentional mistunings to achieve the best robust forced response as above based on an arrangement determined by the optimization.

Figure 8:
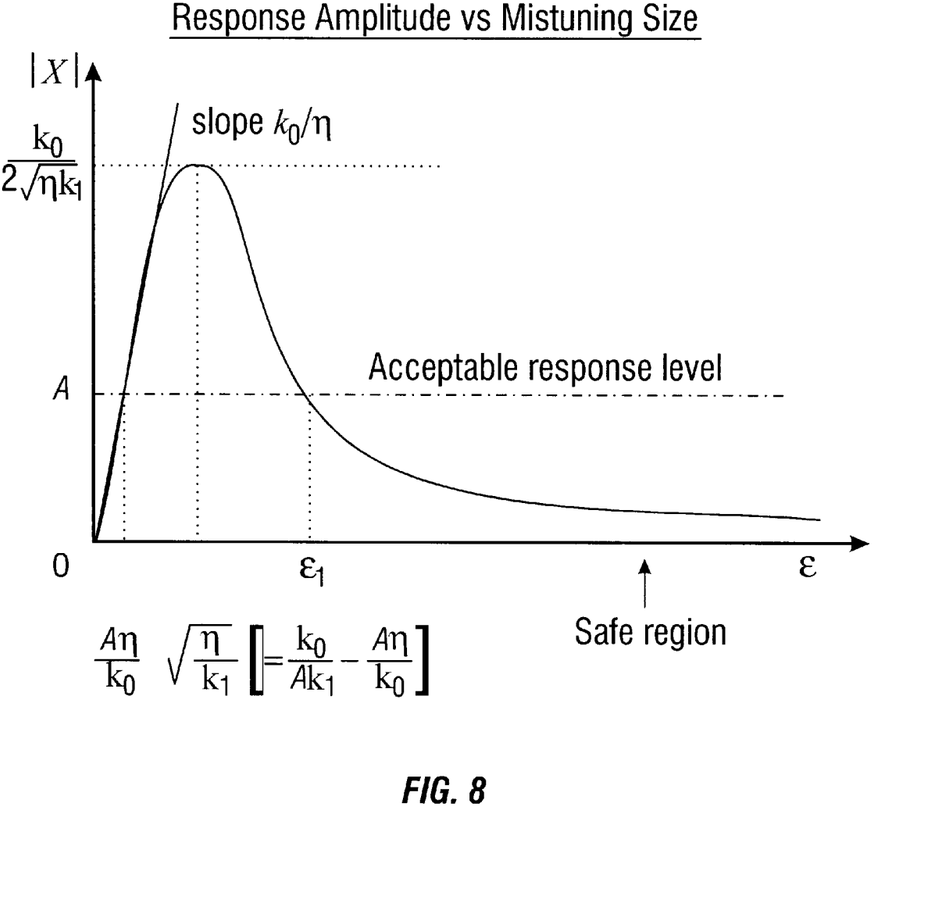
FIG. 8 is a chart showing a forced response as a function of mistuning size.

However, the forced response differs from the stability design in that a very small mistuning may change the respective forced response from an acceptable level to an unacceptable level. FIG. 8 is a chart showing a forced response as a function of mistuning size. In many rotors, the forced response may change drastically with small mistuning such as in the mistuning region from 0 to near $\epsilon_1 = k_0/(Ak_1) - A\eta/k_0$ (a known value) shown in FIG. 8.

Therefore, the blades of a rotor need to be mistuned by an amount bigger than $\epsilon_1$ in FIG. 8 to be beneficial to improving the forced response. That is, a given set of blades must be sufficiently mistuned. Therefore, the rotor remains in the "safe" region despite additional random small changes in mistuning due to manufacturing variations and wear.

Figure 9:
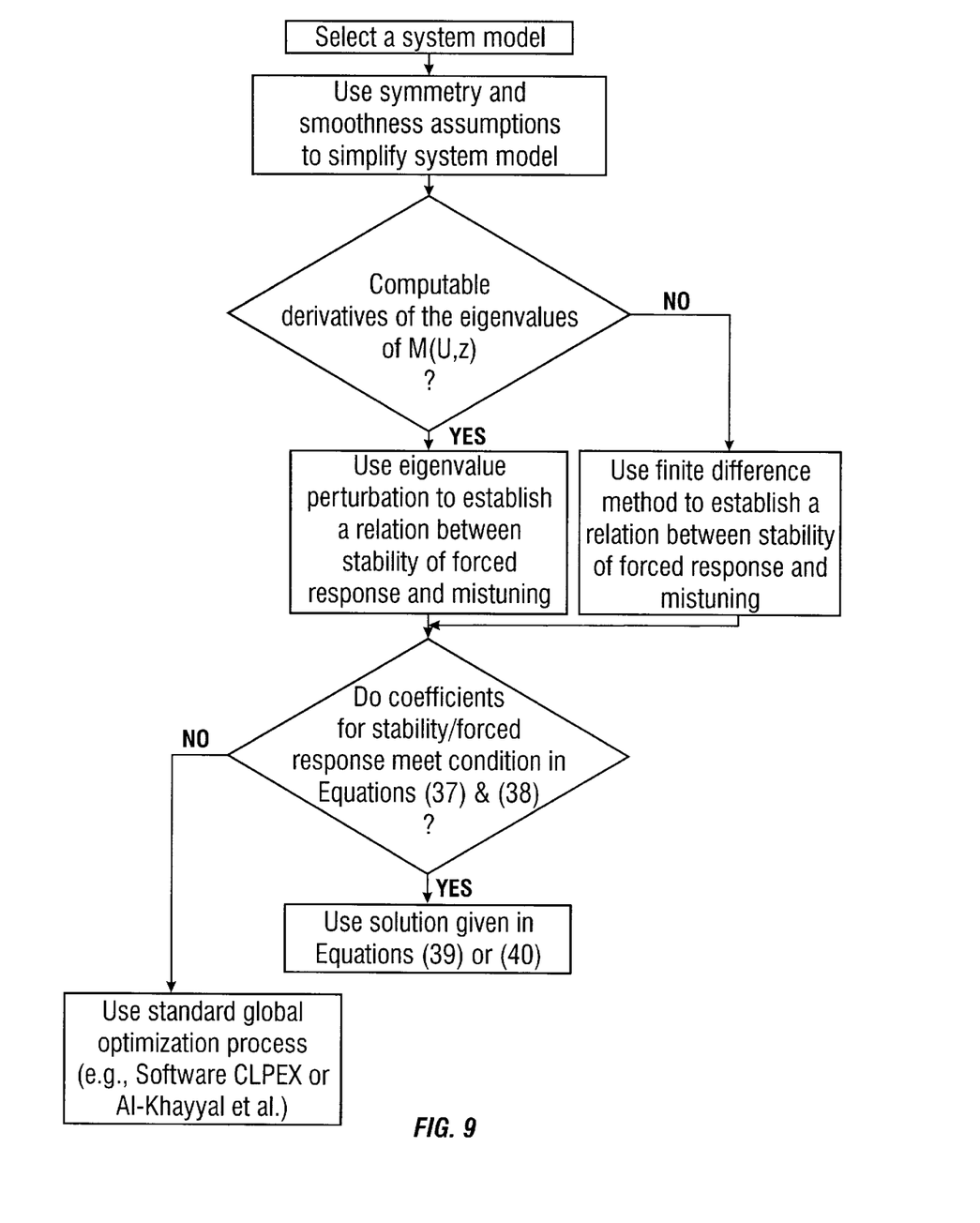
FIG. 9 is a flowchart showing a preferred method of analyzing and designing mistuning and blade arrangement for achieving optimized forced response and/or stability boundaries.

In summary, both the stability optimization and the optimization of the forced response can be analyzed in a similar manner using the symmetry and smoothness assumptions. FIG. 9 is a flowchart showing the above described method of analyzing and designing mistuning and blade arrangement for achieving optimized forced response and/or stability boundaries. This approach significantly simplifies the computation complexity in such optimization problems and provides detailed information on the behavior of the rotors.

Although the present invention has been described in detail with reference to a few embodiments, various modifications and enhancements may be made without departing from the scope and spirit of the following claims.

What is claimed is:

1. A method of designing and constructing a rotor having mistuned blades, comprising:

selecting a system model that simulates aerodynamics of said rotor, said system model including a specified aerodynamic parameter indicative of an aerodynamic property of said rotor;

applying a selected symmetry to said system model to simplify computation complexity of said system model;

determining a correlation between said specified aerodynamic parameter and a mistuning parameter of said blades; and arranging said blades with respect to one another in a sequence based on said correlation such that said specified aerodynamic parameter is within a specified optimal range to improve a performance of said rotor.

2. A method as in claim 1, wherein determining said correlation between said specified aerodynamic parameter and a mistuning parameter of said blades comprises:

determining eigenvalues of a linear matrix indicative of said system model;

performing an eigenvalue perturbation to determine a dependence of said specified aerodynamic parameter on said mistuning parameter when said eigenvalues are differentiable; and using a finite difference process to determine a dependence of said specified aerodynamic parameter on said mistuning parameter when said eigenvalues are not differentiable.

3. A method as in claim 1, wherein arranging said blades is based on a solution by using a global optimization process.

4. A method as in claim 1, wherein arranging said blades is based on a solution by using a global optimization process.

5. A method as in claim 1, wherein said sequence for arranging said blades is $$z_{k+1} \geq z_k \geq z_{k+2} \geq z_{k-1} \geq \ldots \geq z_{r-1} \geq z_2 \geq z_r \geq z_1,$$

when r is an even number; or $$z_{k+1} \geq z_k \geq z_{k+2} \geq z_{k-1} \geq \ldots \geq z_2 \geq z_{r-1} \geq z_1 \geq z_r,$$

when r is an odd number, wherein $z_i$ indicates an amount of mistuning in ith blade, r is a total number of said blades, and k is $$k \triangleq \begin{cases} \dfrac{r}{2}, & r \text{ even;} \\ \dfrac{r-1}{2}, & r \text{ odd.} \end{cases}$$

6. A method as in claim 1, wherein said specified aerodynamic parameter is configured and selected to indicate a stability boundary of said system model.

7. A method as in claim 1, wherein said specified aerodynamic parameter is configured and selected to indicate a forced response of said system model.

8. A method as in claim 1, wherein said selected symmetry is a rotation symmetry.

9. A rotor, comprising:

a rotor disk; and a total of r blades formed on said rotor disk and arranged symmetrically around said rotor disk, said blades having blade properties that are different from an ideal blade, wherein said blades are arranged in a following sequence $$z_{k+1} \geq z_k \geq z_{k+2} \geq z_{k-1} \geq \ldots \geq z_{r-1} \geq z_2 \geq z_r \geq z_1,$$

when r is an even number; or $$z_{k+1} \geq z_k \geq z_{k+2} \geq z_{k-1} \geq \ldots \geq z_2 \geq z_{r-1} \geq z_1 \geq z_r,$$

when r is an odd number, wherein $z_i$ indicates an amount of difference in ith blade compared to said ideal blade, and k is $$k \triangleq \begin{cases} \dfrac{r}{2}, & r \text{ even;} \\ \dfrac{r-1}{2}, & r \text{ odd.} \end{cases}$$

* * * * *